United States Patent
Kaminushi

(10) Patent No.: US 9,537,930 B2
(45) Date of Patent: Jan. 3, 2017

(54) INFORMATION SYSTEM, FILE SERVER, AND FILE SERVER CONTROL METHOD

(71) Applicant: Kyohsuke Kaminushi, Kanagawa (JP)

(72) Inventor: Kyohsuke Kaminushi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 14/192,958

(22) Filed: Feb. 28, 2014

(65) Prior Publication Data

US 2014/0280774 A1   Sep. 18, 2014

(30) Foreign Application Priority Data

Mar. 14, 2013   (JP) ................... 2013-052477

(51) Int. Cl.
| | |
|---|---|
| G06F 15/16 | (2006.01) |
| H04L 29/08 | (2006.01) |
| H04L 29/06 | (2006.01) |
| H04L 12/64 | (2006.01) |

(52) U.S. Cl.
CPC ........... *H04L 67/06* (2013.01); *H04L 12/6418* (2013.01); *H04L 63/029* (2013.01)

(58) Field of Classification Search
CPC .................................................. H04L 67/2833
USPC ................................................. 709/219, 217
See application file for complete search history.

(56) References Cited

U.S. PATENT DOCUMENTS

| | | | | |
|---|---|---|---|---|
| 7,644,164 B2* | 1/2010 | Saiki | .................. | H04L 63/0272 709/203 |
| 9,059,843 B2* | 6/2015 | Takata | ................ | G06F 21/6245 |
| 2005/0066327 A1* | 3/2005 | Dettinger | ............ | G06F 11/1482 718/100 |
| 2005/0086359 A1* | 4/2005 | Banerjee | ............... | G06F 9/5027 709/232 |
| 2007/0055703 A1* | 3/2007 | Zimran | ............. | G06F 17/30123 |

(Continued)

FOREIGN PATENT DOCUMENTS

| | | |
|---|---|---|
| JP | 2004-046681 | 2/2004 |
| JP | 2007-287159 | 11/2007 |

(Continued)

OTHER PUBLICATIONS

Weisz, Russell, First aid for thread-impaired: Using multiple threads with MFC, Microsoft Systems, Journal, Dec. 1996.*

*Primary Examiner* — David Lazaro
*Assistant Examiner* — Marie Georges Henry
(74) *Attorney, Agent, or Firm* — IPUSA, PLLC

(57) ABSTRACT

An information system accesses an internal network via a firewall from an information terminal of an external network. The information system includes a relay server provided in the external network; and a file server provided in the internal network. The file server includes a relay agent configured to manage a network connection between the file server and the relay server, and a file system configured to store desired data. The relay agent generates a thread based on a number of requests received by the relay server from the information terminal, acquires the request by using the generated thread, and transfers the acquired request to the file system. The file system identifies data corresponding to the transferred request, and outputs the identified data to the information terminal via the relay agent and the relay server.

4 Claims, 7 Drawing Sheets

(56) References Cited

U.S. PATENT DOCUMENTS

| | | | | |
|---|---|---|---|---|
| 2012/0317616 | A1* | 12/2012 | Kim | H04L 63/1425 |
| | | | | 726/3 |
| 2013/0212163 | A1 | 8/2013 | Shimomoto | |
| 2013/0268624 | A1 | 10/2013 | Yagiura | |
| 2014/0082139 | A1* | 3/2014 | Shimomoto | H04L 67/125 |
| | | | | 709/217 |
| 2014/0164517 | A1* | 6/2014 | Valdetaro | H04L 63/0281 |
| | | | | 709/204 |

FOREIGN PATENT DOCUMENTS

| | | |
|---|---|---|
| JP | 2013-254404 | 12/2013 |
| JP | 2014-078220 | 5/2014 |

* cited by examiner

INFORMATION SYSTEM, FILE SERVER, AND FILE SERVER CONTROL METHOD

BACKGROUND OF THE INVENTION

1. Field of the Invention

The present invention relates to an information system, a file server, and a file server control method.

2. Description of the Related Art

There is known a technology of providing a firewall between an internal network (an in-company network, etc.) and an external network, to prevent unauthorized access from an external network (the Internet, etc.). A firewall is for allowing passage of necessary communications and blocking unnecessary communications. There is an example of a firewall by which access from an internal network to an external network is possible but access from an external network to an internal network is restricted (see, for example, Patent Document 1).

In the technology disclosed in Patent Document 1, a relay agent (content output unit) is used to acquire a request (content output request) assigned to itself which is accumulated in a relay server (content output server). Therefore, by the technology disclosed in Patent Document 1, when a plurality of requests are accumulated in the relay server, there are cases where the relay server cannot prioritize the processing of a relay agent for which many requests are made. That is to say, by the technology disclosed in Patent Document 1, the relay server performs information processing corresponding to a thread sent from the relay agent, and therefore there are cases where the relay server cannot prioritize the processing of a particular relay agent.

Patent Document 1: Japanese Laid-Open Patent Publication No. 2004-46681

SUMMARY OF THE INVENTION

The present invention provides an information system, a file server, and a file server control method, in which one or more of the above-described disadvantages are eliminated.

According to an aspect of the present invention, there is provided an information system for accessing an internal network via a firewall from an information terminal of an external network, the information system including a relay server provided in the external network; and a file server provided in the internal network, wherein the file server includes a relay agent configured to manage a network connection between the file server and the relay server, and a file system configured to store desired data, wherein the relay agent generates a thread based on a number of requests received by the relay server from the information terminal, acquires the request by using the generated thread, and transfers the acquired request to the file system, and the file system identifies data corresponding to the transferred request, and outputs the identified data to the information terminal via the relay agent and the relay server.

According to an aspect of the present invention, there is provided a file server including a relay agent configured to manage a network connection; and a file system configured to store desired data, wherein the relay agent generates a thread based on a number of requests received by a relay server outside the file server, acquires the request by using the generated thread, and transfers the acquired request to the file system, and the file system identifies data corresponding to the transferred request, and outputs the identified data to the relay server via the relay agent.

According to an aspect of the present invention, there is provided a file server control method including generating a first thread for acquiring a number of requests accumulated in a relay server; acquiring the number of requests by using the generated first thread; and generating or eliminating a second thread based on the number of requests acquired at the acquiring, wherein the generating or eliminating includes eliminating the second thread when the acquired number of requests is zero, and generating the second thread when the acquired number of requests is one or more.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
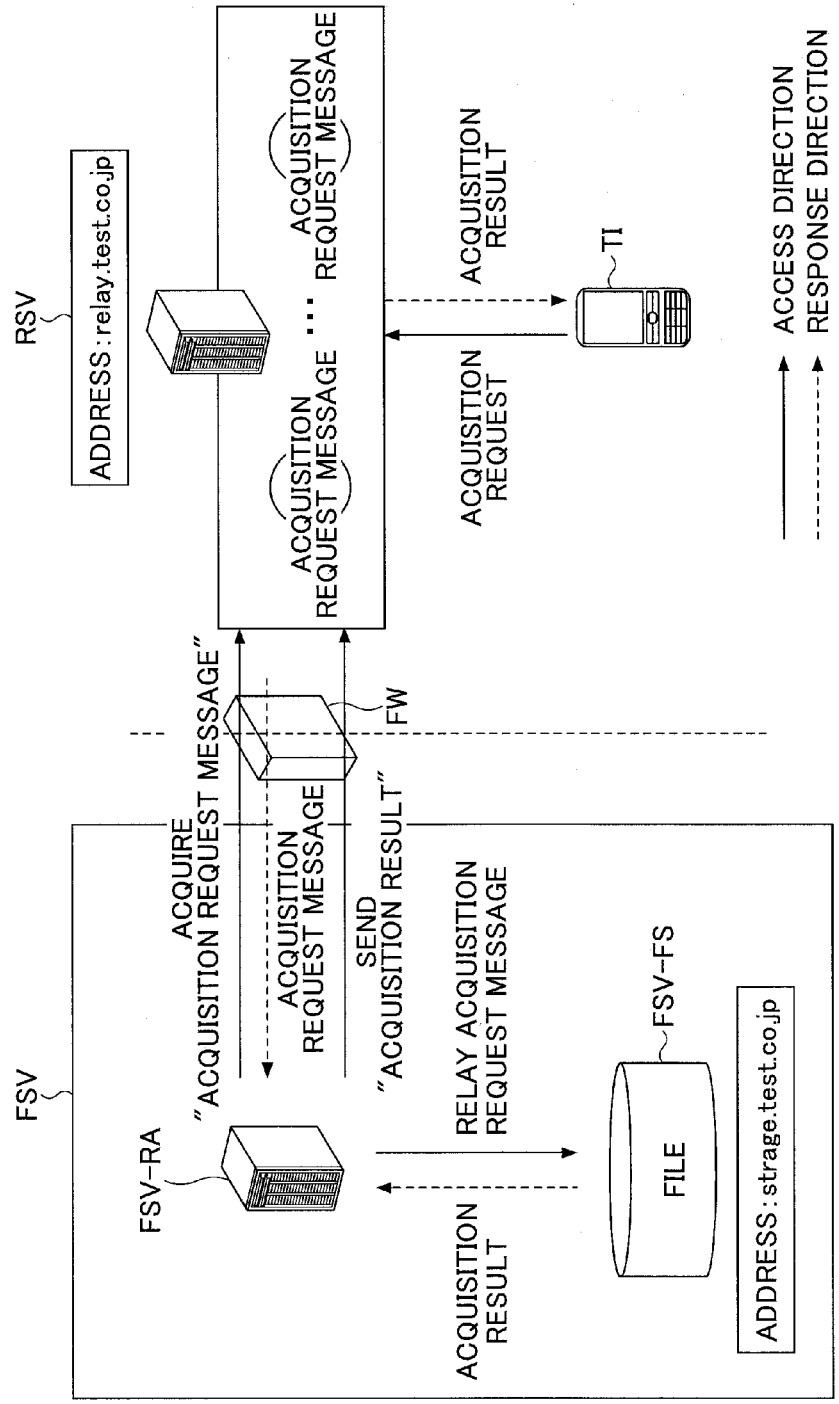
FIG. 1 is a schematic system diagram of an example of an information system according to an embodiment of the present invention.

A description is given, with reference to the accompanying drawings, of an information system according to non-limiting embodiments of the present invention. Other than the information system described below, an embodiment of the present invention is also applicable to an information management system, an information accumulation system, an information processing system, a file server system, so called cloud computing, and other systems (apparatus, device, unit, computer network, etc.) by which access is made from an external network to an internal network via a firewall (or router).

Note that in the following descriptions, the same devices, components, and members are denoted by the same or corresponding reference numerals throughout the accompanying drawings, and redundant descriptions are omitted. Furthermore, the drawings do not limit the relationships between the devices, components, and members. Therefore, the specific correlations may be determined by those skilled in the art in view of the following unlimited embodiments.

Descriptions of an information system 100 according to an embodiment of the present invention are given in the following order.

1. Configuration of System
2. Process Flow

3. Program and Recording Medium
1. Configuration of System

With reference to FIG. 1, a description is given of an information system 100 according to an embodiment of the present invention. The information system 100 according to the present embodiment is a system by which access can be made from an external network to an internal network via a firewall. Note that arrows expressed by solid lines in FIG. 1 indicate the output direction of requests (access direction). Furthermore, arrows expressed by dashed lines in FIG. 1 indicate the output direction of responses to requests (response direction).

In the following descriptions, the information system 100 according to the present embodiment performs a method (packet filtering method) of passing/blocking communications under the conditions of an IP layer (network layer, layer 3) or a TCP/UDP layer (transport layer, layer 4) in a so called OSI reference model. Furthermore, the information system 100 according to the present embodiment implements control (dynamic method) by dynamically changing the connection/blocking conditions such as the IP address and the port number of the destination and the transmission source (in the present embodiment, information relevant to a file server FSV described below). However, the information system to which the present invention can be applied is not limited to a packet filtering method. For example, the present invention is also applicable to a method (application/gateway method) for controlling the communication at a level of an application protocol such as HTTP and FTP of layer 7.

As illustrated in FIG. 1, the information system 100 includes a file server FSV provided in an internal network and a relay server RSV provided in an external network. Furthermore, in the present embodiment, the information system 100 includes an information terminal TI for requesting the relay server RSV to output information (hereinafter, "acquisition request"). Furthermore, the information system 100 includes a firewall FW between the internal network and the external network.

An external network is a global network such as an outside network (an open network, the Internet, etc.). An internal network is a local network such as an in-company network (closed network, private network, etc.).

The information system 100 communicates an access from the information terminal TI of the external network to the file server FSV of the internal network via the relay server RSV and the firewall FW. That is to say, the information system 100 uses the firewall FW to allow passage of necessary communications and to block unnecessary communications.

Note that the above configuration of the information system 100 is one example; the present invention may have various systems or configurations according to the purpose and objective. Furthermore, the information system 100 may further include a configuration other than the above configuration. Furthermore, the information system 100 may include a plurality of file servers, a plurality of relay servers, or a plurality of information terminals. For example, the information system 100 may have a mail server, a printer server, a HTTP server, or a projector server in the internal network.

The relay server RSV is for receiving requests (acquisition request, acquisition request message, etc.) received from the information terminal TI (described below). Furthermore, the relay server RSV is for accumulating a plurality of requests received from the information terminal TI. Furthermore, the relay server RSV is for outputting, to the information terminal TI (described below), acquisition results from a relay agent FSV-RA (described below). The relay server RSV is connected to the external network. As the relay server RSV, a server including a processor such as a CPU (Central Processing Unit) of the known technology, a memory (ROM, RAM, etc.), and a control unit.

Specifically, first, the relay server RSV accumulates acquisition requests received from the information terminal TI (described below). Next, the relay server RSV outputs an accumulated acquisition request according to a thread (acquisition of acquisition request message) from the file server FSV (relay agent FSV-RA described below). Next, the relay server RSV receives a thread (response of acquisition result) from the file server FSV (relay agent FSV-RA), and outputs (relays) the received acquisition result to the information terminal TI.

The file server FSV is for storing desired data (or a file, a folder, a program, a disk). The file server FSV is connected to the internal network. Furthermore, in the present embodiment, the file server FSV includes the relay agent FSV-RA for managing the network connection between the file server FSV and the relay server RSV, and a file system FSV-FS for storing desired data.

The relay agent FSV-RA is for managing network connections of the file server FSV. In the present embodiment, the relay agent FSV-RA executes a process request (acquisition request, etc.) from outside the file server FSV, by using units obtained by dividing the process (hereinafter, "thread").

Specifically, first, the relay agent FSV-RA generates a thread (first thread, hereinafter, "control thread SD-C") for acquiring "information relevant to the acquisition request (request)" accumulated in the relay server RSV. Next, the relay agent FSV-RA uses the generated "control thread SD-C" to acquire "information relevant to the acquisition request". At this time, the relay agent FSV-RA acquires "information relevant to the acquisition request" assigned to itself. The "information relevant to the acquisition request (request)" is, for example, an indication of whether there is an acquisition request, the number of acquisition requests, and the request assigned to itself.

Note that the relay agent FSV-RA may acquire the "information relevant to the acquisition request" by, for example, polling (a method of periodically confirming whether there is a acquisition request) or comet (a method of one-directionally confirming whether there is a acquisition request from the relay agent FSV-RA at an arbitrary timing).

Next, the relay agent FSV-RA generates a thread (second thread, hereinafter "message relay thread SD-M") for acquiring an "acquisition request (acquisition request message")" based on the acquired "information relevant to the acquisition request". The relay agent FSV-RA can generate a plurality of message relay threads SD-M based on the number of "acquisition requests" assigned to itself in the "information relevant to the acquisition request". Subsequently, the relay agent FSV-RA acquires the "acquisition request" using the generated message relay thread SD-M. Furthermore, the relay agent FSV-RA transfers the acquired "acquisition request" to the file system FSV-FS described below.

Furthermore, the relay agent FSV-RA returns (transfers), to the relay server RSV, the search result (acquisition result) searched by the file system FSV-FS, and then eliminates the message relay thread SD-M for acquiring the "acquisition request".

Note that details of the operations of processing the acquisition request using the thread by the relay agent FSV-RA are given below at (2. Process Flow).

The file system FSV-FS (for example, a storage unit) is for storing desired data. Furthermore, in the present embodiment, the file system FSV-FS searches for particular data from the stored data, based on a process request (acquisition request, etc.) from outside the file server FSV. Furthermore, the file system FSV-FS outputs the search result found as a result of the search (hereinafter, "acquisition result") outside the file server FSV. Note that the file system FSV-FS may use known technology (hard disk, memory, ROM, RAM, DVD, tape drive, etc.).

Specifically, the file system FSV-FS identifies the data corresponding to an acquisition request (thread) transferred from the relay agent FSV-RA. Furthermore, the file system FSV-FS returns the identified data as an acquisition result to the relay agent FSV-RA. Accordingly, the file server FSV can output the acquisition result outside the file server FSV (in the present embodiment, the relay server RSV), by using the relay agent FSV-RA.

The information terminal (communication terminal) TI is a terminal that can be connected to a smart device (for example, a smartphone and a tablet terminal), a personal computer, a work station, a PDA (Personal Digital Assistant), and other networks. Furthermore, the information terminal TI is connected to the external network by cable communication and/or radio communication.

A smart device is a highly-functional mobile terminal having the same functions as, for example, a personal computer. A smart device can transmit and receive data via the network. Furthermore, a smart device has, for example, a touch panel, and can receive intuitive input operations from a user.

The firewall FW is for controlling communications between the external network and the internal network. For example, the firewall FW blocks unauthorized accesses from the external network. Furthermore, for example, the firewall FW allows passage of communications from the internal network. Note that the firewall FW can use a known technology.

2. Process Flow

Figure 2:
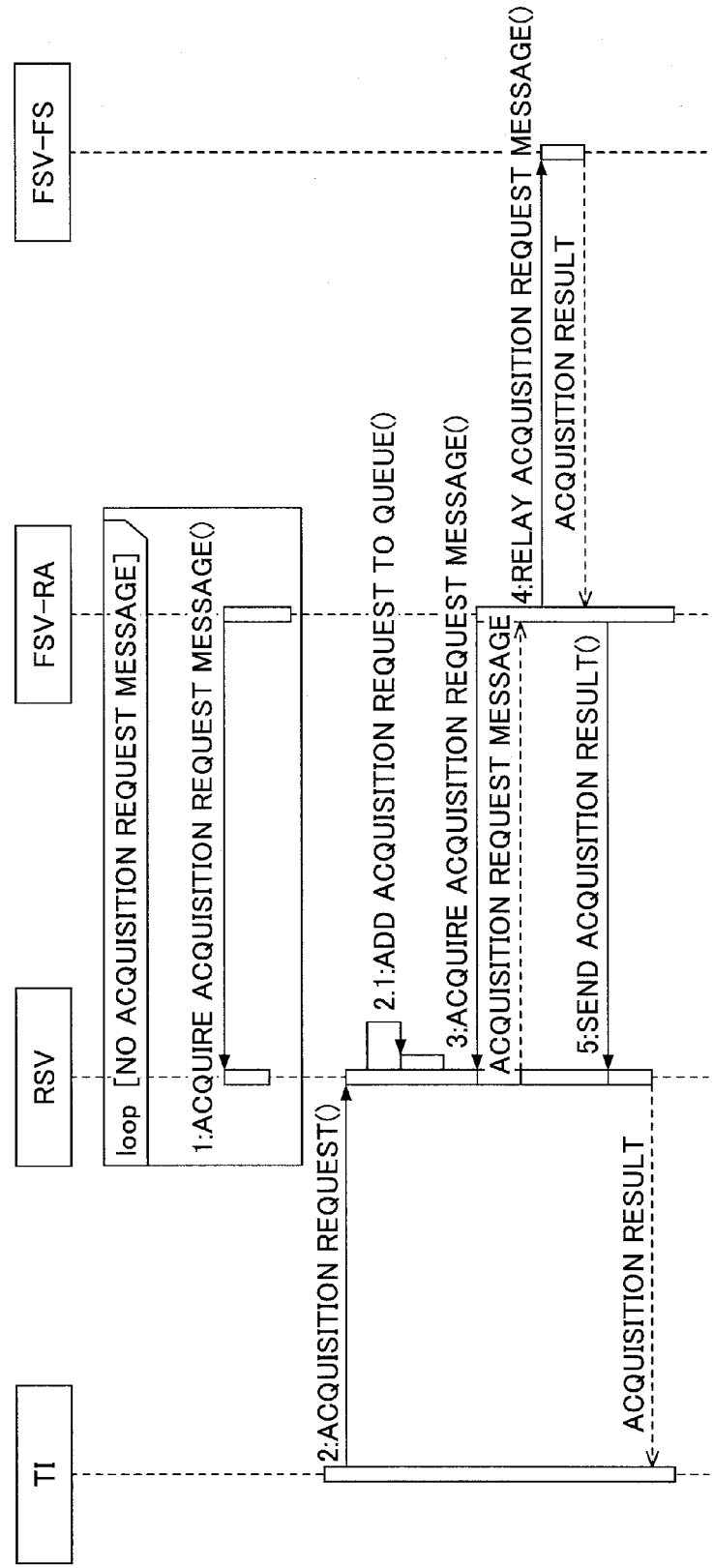
FIG. 2 is a sequence diagram for describing an example of operations of the information system according to the embodiment of the present invention.
Figure 3:
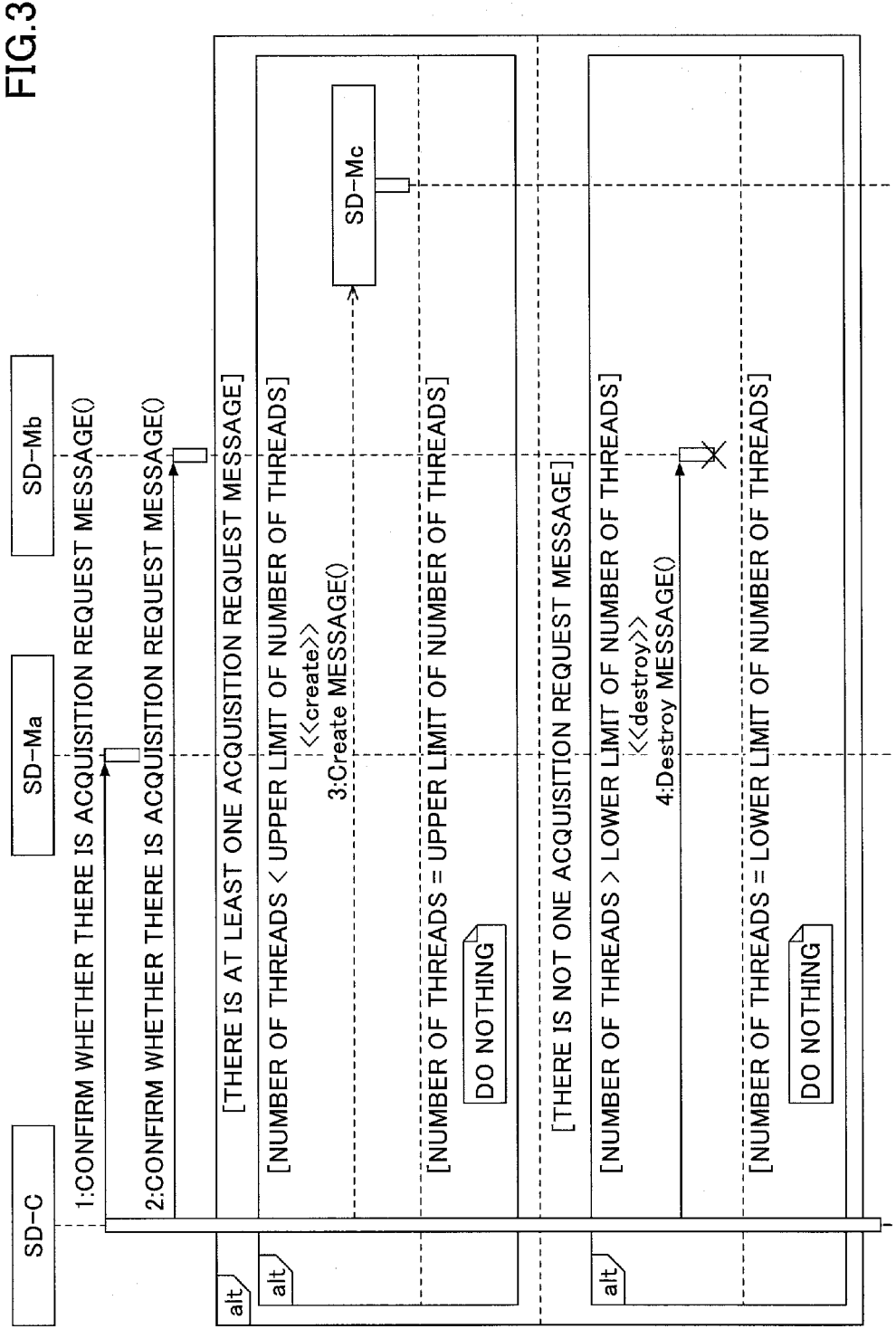
FIG. 3 is a sequence diagram for describing an example of operations of a relay agent of the information system according to the embodiment of the present invention.

With reference to FIGS. 2 and 3, a description is given of an example of operations of the information system 100 according to the present embodiment.

As illustrated in FIG. 2, first, in a first thread generating step, the information system 100 monitors the "information relevant to the acquisition request" accumulated in the relay server RSV, by using the relay agent FSV-RA (file server FSV) provided in the internal network. Specifically, the relay agent FSV-RA first generates a "control thread SD-C". Next, the relay agent FSV-RA uses the generated "control thread SD-C" to monitor (polling, comet, etc.) the "information relevant to the acquisition request" accumulated in the relay server RSV.

Next, in a request transmission step, the information system 100 inputs an "acquisition request" in the relay server RSV provided in the external network, by the information terminal TI provided in the external network. The relay server RSV accumulates (stores) the input "acquisition request". The relay server RSV can store (add) the input "acquisition request" in, for example, a predetermined queue.

Next, in a request number acquisition step, the information system 100 uses the relay agent FSV-RA to acquire "information relevant to the acquisition request" assigned to itself (file server FSV), with regard to the "acquisition request" accumulated in the relay server RSV. Specifically, the relay agent FSV-RA uses the "control thread SD-C" generated in advance to acquire the "information relevant to the acquisition request" accumulated in the relay server RSV. In the present embodiment, the relay agent FSV-RA acquires, as the "information relevant to the acquisition request", "an indication of whether there is an acquisition request" or "the number of acquisition requests" assigned to itself (file server FSV).

Subsequently, in a thread control step (second thread generating/eliminating step), the information system 100 controls the "message relay thread SD-M" based on the "information relevant to the acquisition request" acquired at the request number acquisition step.

Specifically, as illustrated in FIG. 3, in the second thread generating/eliminating step, the relay agent FSV-RA generates a "message relay thread SD-Ma" when the number of requests is one or more, based on the number of requests acquired at the request number acquisition step. When the generated number of threads is less than the upper limit of the number of threads determined in advance ("number of threads"<"upper limit of number of threads" in FIG. 3), the relay agent FSV-RA may generate a new "message relay thread SD-M (second thread)". Note that the relay agent FSV-RA does not have to generate a "message relay thread SD-M (second thread)" when generated number of threads exceeds the upper limit of the number of threads determined in advance. Furthermore, when the generated number of threads is equal to the upper limit of the number of threads determined in advance ("number of threads"="upper limit of number of threads" in FIG. 3), the relay agent FSV-RA does not have to generate or eliminate a thread.

Furthermore, in the second thread generating/eliminating step (thread control step), the relay agent FSV-RA eliminates a "message relay thread SD-Mb" when the number of requests is zero, based on the number of requests acquired at the request number acquisition step. When the generated number of threads is greater than the lower limit of the number of threads determined in advance ("number of threads">"lower limit of number of threads" in FIG. 3), the relay agent FSV-RA may eliminate the "message relay thread SD-M (second thread)". Note that when the generated number of threads is less than or equal to the lower limit of the number of threads determined in advance, the relay agent FSV-RA does not have to eliminate the "message relay thread SD-M (second thread)". Furthermore, when the generated number of threads is equal to the lower limit of the number of threads determined in advance ("number of threads"="lower limit of number of threads" in FIG. 3), the relay agent FSV-RA does not have to generate or eliminate a thread.

Furthermore, when generating or eliminating the "message relay thread SD-M (second thread)", the relay agent FSV-RA may generate or eliminate one or two or more "message relay threads SD-M (second threads)".

Note that the upper limit and the lower limit of the number of threads may be a value corresponding to the relay agent FSV-RA, the relay server RSV, or other specifications of the information system 100. Furthermore, the upper limit and the lower limit of the number of threads may be a value that is determined in advance according to experiments or numerical calculations. Furthermore, the upper limit and the lower limit of the number of threads may be an arbitrary value input to the information system 100 by the user.

Next, in a request acquisition step, the information system 100 uses the relay agent FSV-RA to acquire an "acquisition request" accumulated in the relay server RSV. Specifically, the relay agent FSV-RA uses the "message relay thread SD-M" controlled in the thread control step, to acquire an "acquisition request" assigned to itself (file server FSV), from the acquisition requests stored in, for example, the queue of the relay server RSV. Note that the relay agent FSV-RA may further use the "control thread SD-C" generated in the first thread generating step to acquire the "acquisition request" assigned to itself (file server FSV).

Next, in a result output step, the information system 100 uses the file system FSV-FS (file server FSV) to identify data stored in the file system FSV-FS, based on the "acquisition request" acquired in the request acquisition step. Furthermore, the information system 100 outputs the identified data to a relay server RSV. Then, the relay server RSV outputs (relays) the acquisition result to the information terminal TI.

As described above, by the information system 100 according to an embodiment of the present invention, the relay agent FSV-RA can be used to acquire a request (acquisition request, acquisition request message, etc.) assigned to itself, which is accumulated in the relay server RSV. Furthermore, by the information system 100, the relay agent FSV-RA can be used to (for example, dynamically) generate or eliminate the message relay thread SD-M (second thread) for acquiring a request assigned to itself. Accordingly, by the information system 100, when the relay server RSV accumulates a plurality of requests, based on the message relay thread SD-M (for example, the number of threads) generated by the relay agent FSV-RA, the relay server RSV can prioritize the process of the relay agent having a large number of requests. That is to say, by the information system 100, when the relay server RSV accumulates a plurality of requests, the resources of the relay server RSV can be concentrated to the process of the relay agent FSV-RA (file server FSV) having a large number of requests.

3. Program and Recording Medium

A program Pr of a data management method according to an embodiment of the present invention executes a method of controlling an information system, the method including a request transmission step of using an information terminal provided in an external network to transmit a request to a relay server provided in the external network, a request number acquisition step of using a thread generated by a file server provided in an internal network to acquire the number of requests received by the relay server, a thread control step of controlling the number of threads to be generated or eliminated based on the number of requests acquired at the request number acquisition step, a request acquisition step of using the thread controlled at the thread control step to acquire a request received by the relay server, and a result output step of identifying data stored in the file server based on the request acquired at the request acquisition step and outputting the identified data to the information terminal via the relay server.

Furthermore, a program Pr of a data management method according to an embodiment of the present invention executes a method of controlling a file server, the method including a first thread generating step of generating a first thread for acquiring the number or requests accumulated in the relay server, a request number acquisition step of using the generated first thread to acquire the number of requests, and a second thread generating/eliminating step of generating or eliminating a second thread based on the number of requests acquired at the request number acquisition step, wherein in the second thread generating/eliminating step, the second thread is eliminated when the number of requests acquired at the request number acquisition step is zero, and the second thread is generated when the number of requests acquired at the request number acquisition step is one or more.

By the above configurations, the same effects as those of the information system 100 according to the embodiment of the present invention can be attained.

Furthermore, an embodiment of the present invention may be a computer-readable recording medium Md recording the above program Pr. The recording medium Md recording the program Pr may be flexible disk (FD), a CD-ROM (Compact Disk-ROM), a CD-R (CD Recordable), a DVD (Digital Versatile Disk), a tape drive, and other computer-readable media, a semiconductor memory such as a flash memory, a RAM, and a ROM, and a memory card, a HDD (Hard Disc Drive), and other computer-readable memories.

Examples

A description is given of an information system 100E according to an example of the present invention. The configuration of the information system 100E according to the present example has the same parts as those of the configuration of the information system 100 according to the embodiment, and therefore the different parts are mainly described in the following order.

Figure 4:
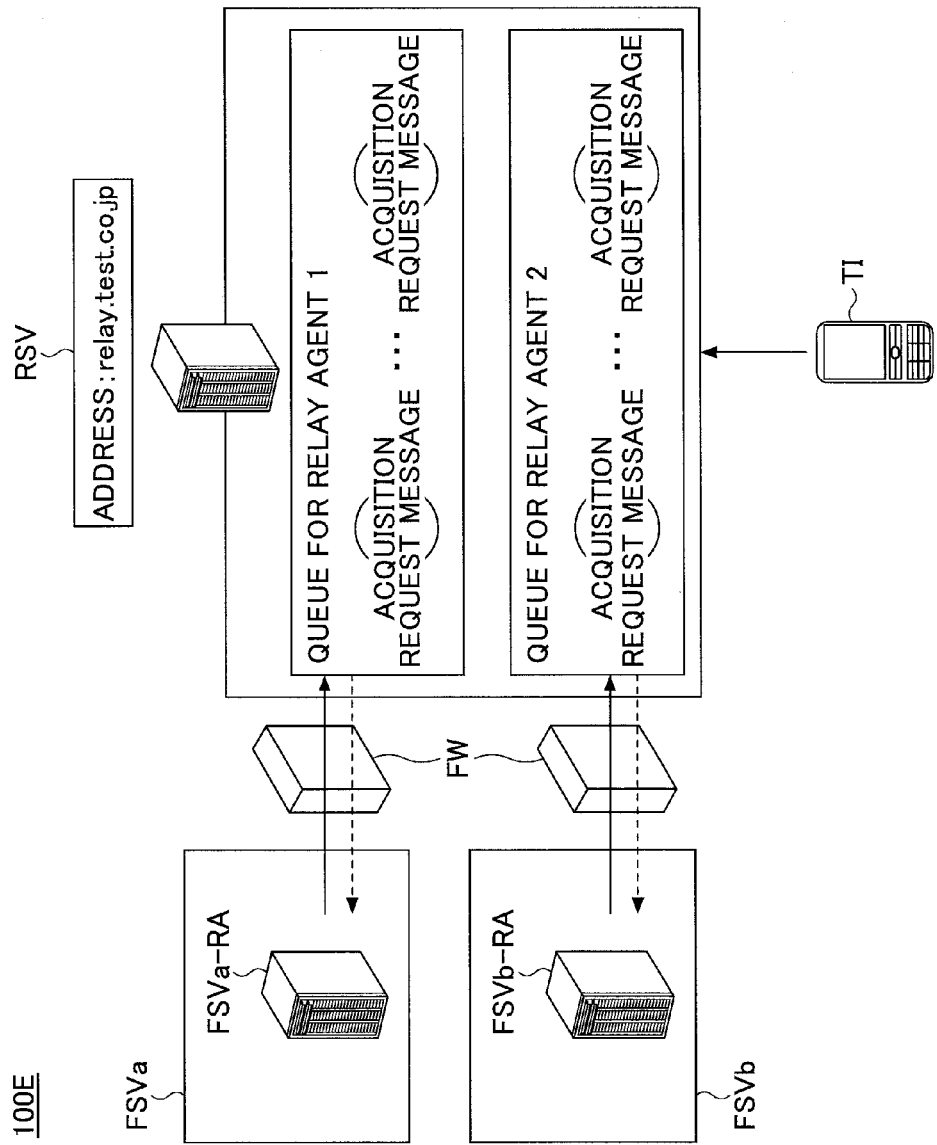
FIG. 4 is a schematic system diagram of an example of an information system according to an example of the present invention.

1. Configuration of System
2. Example of Process Flow
   2-1 Operation of Viewing
   2-2 Operation of Processing Acquisition Request
3. Other Example 1. Configuration of System As illustrated in FIG. 4, the information system 100E according to the present example includes a plurality of file servers FSVa, FSVb. That is to say, the information system 100E includes a plurality of file servers FSVa, FSVb including relay agents FSVa-RA, FSVb-RA, respectively.

Furthermore, the relay server RSV according to the present example includes queues respectively corresponding to the relay agents FSVa-RA, FSVb-RA. Accordingly, the relay server RSV can store the acquisition requests corresponding to the file servers FSVa, FSVb (relay agents FSVa-RA, FSVb-RA) in the respective corresponding queues. Furthermore, the relay agents FSVa-RA, FSVb-RA can confirm the request assigned to itself (file server FSVa or FSVb), by confirming the queue corresponding to the respective relay servers RSV.

Furthermore, the information system 100E according to the present example includes firewalls respectively corresponding to the file servers FSVa, FSVb.

2. Example of Process Flow 2-1 Operation of Viewing

Figure 5:
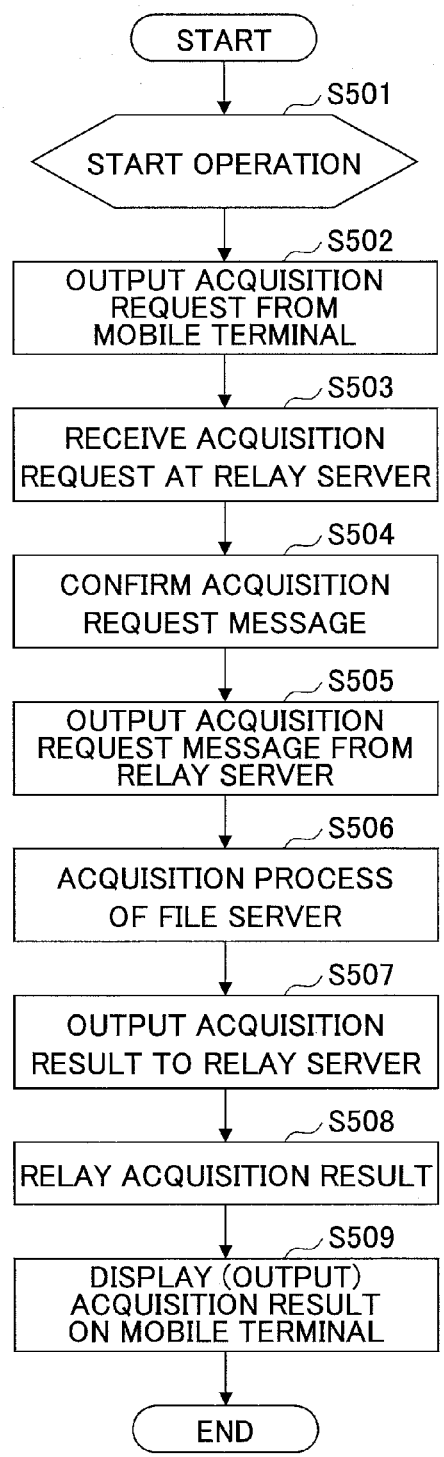
FIG. 5 is a flowchart for describing an example of operations of viewing information performed by the information system according to the example of the present invention.

With reference to FIG. 5, a description is given of an example of an operation of processing a view request form the information terminal TI performed by the information system 100E according to the present example.

As illustrated in FIG. 5, first, the information system 100E starts a view operation in step S501. After starting the view operation, the information system 100E proceeds to step S502.

Next, in step S502, the information system 100E receives input of an acquisition request from the information terminal TI. Subsequently, the information system 100E proceeds to step S503. The information terminal TI may input the acquisition request by using a UI (user interface) of a HTML base.

Next, in step S503, the information system 100E uses the relay server RSV to receive an acquisition request. Subsequently, the information system 100E proceeds to step S504. Specifically, in the present example, the relay server RSV adds an acquisition request to a queue corresponding to a file server FSVa or FSVb for storing the data that is the object of the acquisition request.

In step S504, the information system 100E uses the relay agents FSVa-RA, FSVb-RA to confirm the acquisition request (contents of acquisition request message) received with the relay server RSV. Specifically, the relay agents FSVa-RA, FSVb-RA can confirm the request (for example, whether there is an acquisition request) assigned to itself, by confirming the acquisition request stored in the corresponding queue. Subsequently, the information system 100E proceeds to step S505.

In step S505, the information system 100E uses the relay server RSV to output the acquisition request (contents of acquisition request message) received at step S503. Specifically, the relay server RSV uses the thread (for example, the control thread SD-C or the message relay threads SD-Ma, SD-Mb) sent from the relay agents FSVa-RA, FSVb-RA, to output the acquisition request (contents of acquisition request message) stored in the corresponding queue. Subsequently, the information system 100E proceeds to step S506.

In step S506, the information system 100E uses the file servers FSVa, FSVb to search for data corresponding to the thread returned from the relay server RSV. Subsequently, the information system 100E proceeds to step S507. Specifically, the file servers FSVa, FSVb use the relay agents FSVa-RA, FSVb-RA, to transfer the acquisition request message acquired from the relay server RSV to the file system. At this time, the file system identifies data stored in advance, based on the transferred acquisition request message.

In step S507, the information system 100E uses the file system (file servers FSVa, FSVb) to output the search result (acquisition result) to the relay server RSV via the relay agents FSVa-RA, FSVb-RA. Subsequently, the information system 100E proceeds to step S508. The file servers FSVa, FSVb may convert the format of the data identified in step S506 into an image file format, and output the image file after conversion to the relay server RSV.

In step S508, the information system 100E uses the relay server RSV to output (relay) the acquisition result to the information terminal TI. Subsequently, the information system 100E proceeds to step S509.

In step S509, the information system 100E uses the information terminal TI to output (for example, display) the acquisition result. Subsequently, the information system 100E proceeds to END in FIG. 5, and ends the operation of processing the view request from the information terminal TI.

As described above, by the information system 100E according to an example of the present invention, the same effects as those of the information system 100 according to the embodiment can be attained.

Furthermore, by the information system 100E according to the present example, the acquisition result converted into an image file by using the file server FSV is output to the information terminal TI. Accordingly, by the information system 100E, even when viewing data of an arbitrary format that is not supported by the information terminal TI, the data can be displayed on the information terminal TI in the image file format.

2-2 Operation of Processing Acquisition Request

Figure 6:
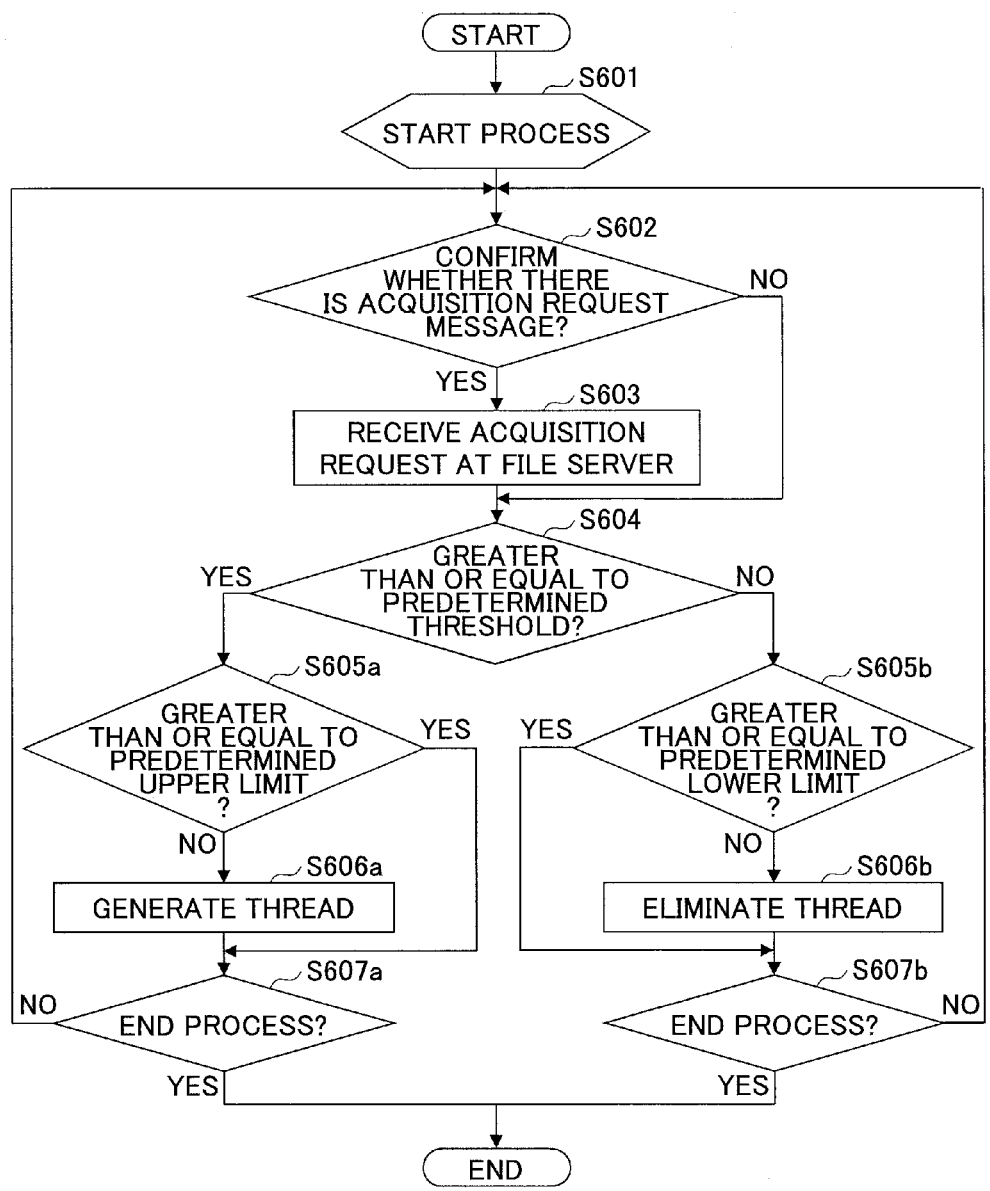
FIG. 6 is a flowchart for describing an example of operations of processing an acquisition request performed by the information system according to the example of the present invention.

With reference to FIG. 6, a description is given of an example of an operation of processing acquisition information performed by the information system 100E according to the present example.

As illustrated in FIG. 6, first, in step S601, the information system 100E starts the operation of processing an acquisition request. After starting the operation, the information system 100E proceeds to step S602.

Next, in step S602, the information system 100E uses the relay agent FSV-RA (FSVa-RA, FSVb-RA) to confirm whether there is an acquisition request message assigned to itself. Note that when confirming whether there is an acquisition request message assigned to itself, the information system 100E may acquire the number of acquisition request messages (number of acquisition requests) assigned to itself. Furthermore, when the number of acquisition request messages assigned to itself is one or more, the information system 100E may determine that "there is an acquisition request message" assigned to itself.

Subsequently, when "there is an acquisition request message", the information system 100E proceeds to step S603. When "there is no acquisition request message", the information system 100E proceeds to step S604.

Next, in step S603, the information system 100E uses the relay agent FSV-RA (file servers FSVa, FSVb) to acquire the respective acquisition requests. Subsequently, the information system 100E proceeds to step S604. The relay agent FSV-RA generates a message relay thread SD-M (SD-Ma, SD-Mb) and uses the generated message relay thread SD-M to acquire the acquisition request. Note that the relay agent FSV-RA may generate a plurality of message relay threads SD-M, and use the generated plurality of message relay threads SD-M to acquire a plurality of acquisition requests.

In step S604, the information system 100E uses the relay agent FSV-RA to determine whether the number of acquisition requests acquired at step S603 is greater than or equal to a predetermined threshold. When the acquired number of acquisition requests is greater than or equal to a predetermined threshold, the information system 100E proceeds to step S605a. Otherwise, the information system 100E proceeds to step S605b.

The predetermined threshold may be a value corresponding to the relay agent FSV-RA, the relay server RSV, or other specifications of the information system 100. Furthermore, the predetermined threshold may be a value that is determined in advance according to experiments or numerical calculations. Furthermore, the predetermined threshold may be an arbitrary value input to the information system 100E by the user.

In step S605a, the information system 100E uses the relay agent FSV-RA to determine whether the number of message relay threads SD-M generated in step S603 is greater than or equal to a predetermined upper limit. When the number is not greater than or equal to a predetermined upper limit, the information system 100E proceeds to step S606a. Otherwise, the information system 100E proceeds to step S607a.

In step S606a, the information system 100E uses the relay agent FSV-RA to generate a new message relay thread SD-M. Subsequently, the information system 100E proceeds to step S607a.

In step S607a, the information system 100E determines whether to end the operation of processing the acquisition request. When the operation is to be ended, the information system 100E proceeds to END in FIG. 6, and ends the operation. Otherwise, the information system 100E returns to step S602.

Meanwhile, in step S605b, the information system 100E uses the relay agent FSV-RA to determine whether the number of message relay threads SD-M generated in step S603 is less than or equal to a predetermined lower limit. When the number is not less than or equal to a predetermined lower limit, the information system 100E proceeds to step S606b. Otherwise, the information system 100E proceeds to step S607b.

In step S606b, the information system 100E uses the relay agent FSV-RA to eliminate the message relay thread SD-M. Subsequently, the information system 100E proceeds to step S607b.

In step S607b, the information system 100E determines whether to end the operation of processing the acquisition request. When the operation is to be ended, the information system 100E proceeds to END in FIG. 6, and ends the operation. Otherwise, the information system 100E returns to step S602.

Note that the upper limit and the lower limit of the number of message relay threads SD-M in steps S605a and S605b may be a value corresponding to the relay agent FSV-RA, the relay server RSV, or other specifications of the information system 100E. Furthermore, the upper limit and the lower limit of the number of threads may be a value that is determined in advance according to experiments or numerical calculations. Furthermore, the upper limit and the lower limit of the number of threads may be an arbitrary value input to the information system 100E by the user.

As described above, by the information system 100E according to an example of the present invention, the same effects as those of the information system 100 according to the embodiment can be attained.

Furthermore, by the information system 100E according to the present example, the relay agent FSV-RA can be used to (for example, dynamically) generate or eliminate the message relay thread SD-M (second thread) for acquiring a request assigned to itself. Accordingly, by the information system 100E, when the relay server RSV accumulates a plurality of requests, the resources of the relay server RSV can be concentrated to the process of the relay agent FSV-RA (file server FSV) having a large number of requests.

Furthermore, by the information system 100E according to the present example, the relay agent FSV-RA can be used to generate or eliminate the message relay thread SD-M (second thread), and therefore it is possible to prevent generating or eliminating a thread to exceed the upper limit or the lower limit of the number of threads that can be used by the relay agent FSV-RA.

3. Other Example

Figure 7:
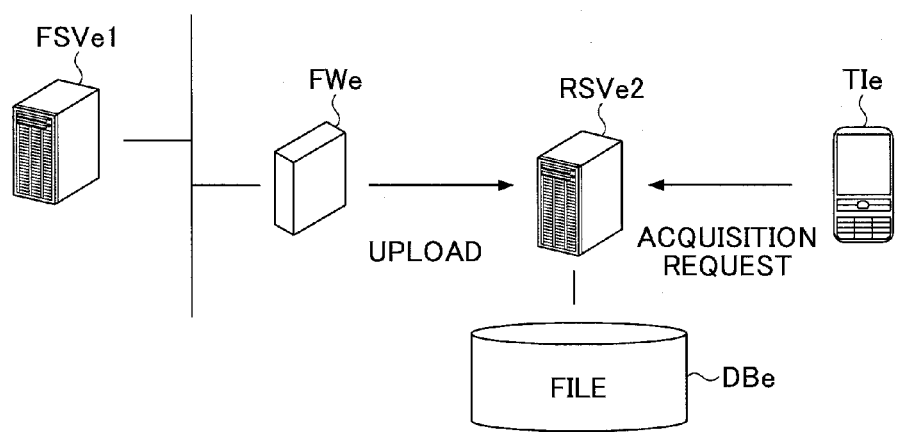
FIG. 7 is a schematic system diagram of another example of an information system.

Another example of the information system is illustrated in FIG. 7.

As illustrated in FIG. 7, in another example of the information system, a relay server RSVe2 is provided in an external network. In another example of the information system, the data saved in a file server FSVe1 provided in an internal network is saved (uploaded) in the relay server RSVe2 in the external network. Accordingly, in another example of the information system, the data saved in the relay server RSVe2 can be referred to from an information terminal (mobile terminal, etc.) connected to the external network.

According to the information system 100E according to an example of the present invention (FIG. 4), in comparison to the other example of the information system (FIG. 7), the data is saved in the internal network, and therefore the security of the system is enhanced. Furthermore, according to the information system 100E (FIG. 4), in comparison to the other example of the information system (FIG. 7), there is no need to install a new file server in the external network, and therefore the system configuration can be simplified. Furthermore, according to the information system 100E (FIG. 4), in comparison to the other example of the information system (FIG. 7), advantageous effects can be achieved as there is no need to upload the data and the newest data in the file server (internal network) can be referred to.

According to one embodiment of the present invention, an information system, a file server, and a file server control method are provided, by which the resources of the relay service can be concentrated to the process of the relay agent having a large number of requests.

The information system, the file server, and the file server control method are not limited to the specific embodiments described herein, and variations and modifications may be made without departing from the spirit and scope of the present invention.

The present application is based on and claims the benefit of priority of Japanese Priority Patent Application No. 2013-052477, filed on Mar. 14, 2013, the entire contents of which are hereby incorporated herein by reference.

What is claimed is:

1. An information system for accessing an internal network via a firewall from an information terminal of an external network, the information system comprising:
   a relay server provided in the external network; and
   a file server provided in the internal network, wherein
   the file server includes
      a relay agent configured to manage a network connection between the file server and the relay server, and
      a file system configured to store desired data, wherein
   the relay agent generates a first thread for monitoring the relay server and acquiring a number of requests received by the relay server from the information terminal, further generates a second thread for acquiring the requests based on the number of the requests acquired by the first thread if the number of the second threads does not exceed a predetermined maximum number of the second threads, acquires the request by using the second thread, and transfers the acquired request to the file system, and
   the file system identifies data corresponding to the transferred request, and outputs the identified data to the information terminal via the relay agent and the relay server.

2. The information system according to claim 1, wherein the relay generates the second thread for acquiring the requests based on the number of the requests or eliminates an existing a second thread based on the number of requests acquired by the first thread.

3. The information system according to claim 2, wherein a plurality of the file servers are included, and
   the relay agent determines whether there is the request assigned to the relay agent itself based on the number of requests acquired by using the first thread, generates the second thread when the relay agent determines that there is the request assigned to the relay agent itself, and eliminates the second thread when the relay agent determines that there is no request assigned to the relay agent itself.

4. A file server control method comprising:

generating, by a relay agent provided to a file server, a first thread for monitoring a relay server and acquiring a number of requests accumulated in the relay server;

acquiring, by the relay agent provided to the file server, the number of requests by using the first thread;

generating, by the relay agent provided to the file server, a second thread for acquiring the requests based on the number of the requests acquired by the first thread if the number of the second threads does not exceed a predetermined maximum number of the second threads, or eliminating, by the relay agent provided to the file server, an existing second thread based on the number of requests acquired at the acquiring, wherein the generating or eliminating includes eliminating the second thread when the acquired number of requests is zero, and generating the second thread when the acquired number of requests is one or more.

* * * * *